Patented Nov. 3, 1953

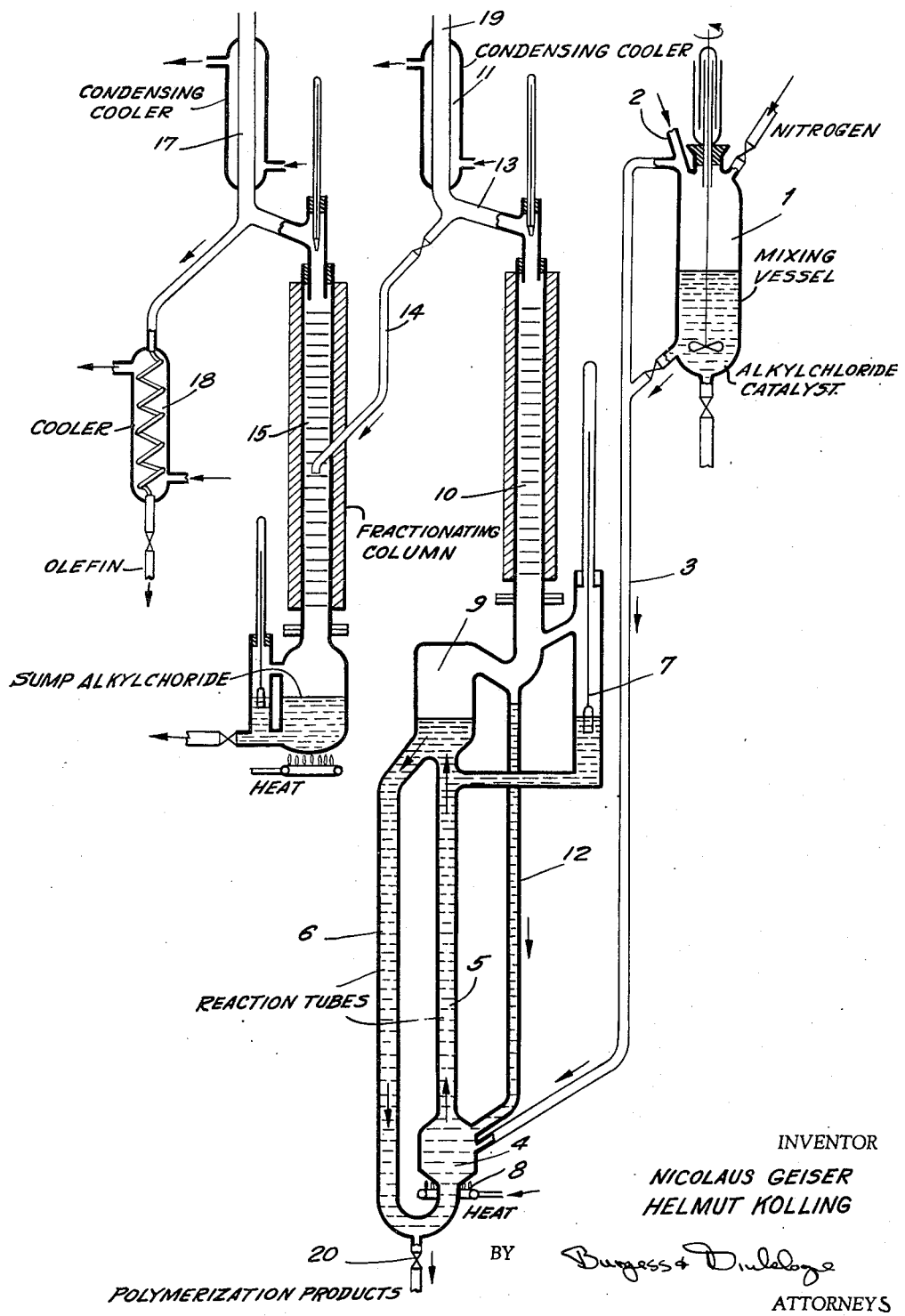

2,658,090

UNITED STATES PATENT OFFICE 2,658,090

PRODUCTION OF OLEFINS BY DECHLORINATION OF ALKYL CHLORIDES

Nikolaus Geiser and Helmut Kolling, Duisburg-Hamborn, Germany, assignors to Ruhrchemie Aktiengesellschaft, Oberhausen Holten, Germany, a German corporation Application February 15, 1950, Serial No. 144,254

11 Claims. (Cl. 260—677)

The manufacture of olefins by the dechlorination of alkyl chlorides is carried out easily and successfully with chloroparaffins whose molecular magnitude exceeds $C_{20}$. In such cases a simple heating to temperatures above 300° is sufficient in itself. However, the lower the C count the more difficult becomes the hydrochloric acid elimination necessary for the formation of olefins. For the dechlorination of alkyl chlorides of a molecular magnitude below $C_{20}$ various other processes have therefore been proposed. The majority of these processes carry out the dechlorination in the gaseous phase above 400° C. and the operation is carried out in part with, and in part without catalysts. As dechlorination catalysts there have been proposed chiefly anhydrous calcium chloride, titanium dioxide, aluminum chloride, barium oxide and caustic lime.

These previously known processes have the disadvantage that, because of the high treatment temperature, there is a carbon separation and gaseous and liquid dissociation products are produced in considerable quantity.

Furthermore, it is already known how to carry through the dechlorination in the gaseous phase over aluminum oxide at 250° C. The residual chlorine content of the products thus obtained amounts in general to 0.3 to 0.4%. Because of the high activity of the aluminum oxide, there are formed in this process, considerable quantities of dissociation and polymerization products. In the treatment of $C_{16}$ and $C_{17}$ alkyl chlorides, for example, there will be formed 7% dissociation products and 25%–30% polymerization products.

It has been found that the dechlorination of alkyl chlorides the carbon count of which is $C_{20}$ or less may be carried out very successfully with aluminum hydrosilicates, preferably at temperatures of 180°–250° C. in the liquid phase. In this case, despite the low temperatures, a complete hydrochloric acid removal is obtained, in which no hydrocarbon dissociation products are produced and only relatively small amounts of polymerization products. This surprisingly good dechlorination is successful even with the addition of very small quantities of aluminum hydrosilicate. Good results are obtained with hydrosilicate-quantities lying between 0.2%–5%, preferably between 0.5%–1%. It is of advantage to use aluminum hydrosilicates of the absorbent type as they are commonly used for bleaching or decolorizing purposes and preferably in activated form such as activated fullers' earths sold for example under the trade-marks "Tonsil" or "Granusil." Also kaolin or clay or other similar silicates in activated or nonactivated form may be used.

The process according to the invention can be carried out in different ways. For example, the work may be carried out in a stirring vessel which is filled with the alkyl chloride to be treated and heated in the presence of hydrosilicate to about 180°–250° C. After a duration of treatment of 1–3 hours, during which a preferably inert gas, for example, nitrogen, is passed through the reaction liquid, the chlorine is split off to leave a residual content of about 0.5%. The conversion may be carried out discontinuously on a batch basis, or continuously with a constant influx and discharge of the reaction constituents. The operative pressure to be used is dependent on the boiling points of the alkyl chlorides introduced. With molecular magnitudes of $C_{10}$ and higher work may be carried out at normal atmospheric pressure.

When the dechlorination is completed the reaction product can easily be separated, by distillation, into products which, on the one hand, show the same C count as the material introduced, and, on the other, consist of resultant polymerization products the quantities of which amount to about 5%–10% of the starting material.

It is of advantage to carry out the dechlorination and the distillation of the reaction products in one process. This method of working is particularly simple with hydrocarbons whose molecular magnitude is $C_9$ or higher since the distillation range at normal pressure of these hydrocarbons is within the temperature range of the dechlorination reaction in accordance with the invention.

It here becomes apparent, that even with a rise in temperature up to 300° C. as occurs in distillation at normal pressure of hydrocarbons up to a maximum of $C_{20}$, no appreciable deterioration in yield results. The proportion of dissociation products even in this case remains very small and there is practically no rise in the quantity of polymerization products. With carbon compounds whose C count is $C_{12}$ and higher, the distillation may be even carried out under reduced pressure and still fall within the range of required reaction temperatures.

If the dechlorination is to be carried out in a common operation with the distillation of the reaction products, then a fractionating column capable of efficient separation must be used, in order to avoid the distilling over of the alkyl chlorides which generally boil at some 40° above the olefin hydrocarbons. It is in most cases desirable, if not at times necessary, that the starting material contains at most two compounds which should not be further removed from each other in the C series than immediate adjacency, since otherwise, in the event of overlapping of the boiling points of the various hydrocarbons and chloro-compounds, an accurate separation between alkyl chlorides and hydrocarbons becomes impossible.

The catalyst, for example 0.5%–2% activated aluminum hydrosilicate (trade-mark "Tonsil") is made into a paste in the original material. To avoid incrustation the distillation plant must have a stirring device or be fitted with a sufficiently quickly working rotating device for the sump product. The distillation itself may be carried out intermittently or continuously.

From the sump of the distillation column the resultant polymerization products are drawn off whilst at the head of the column escape the olefin hydrocarbons, resulting from the dechlorination, mixed with gaseous hydrogen chloride. The chlorine content of the distillate is generally between 0.2%–0.3%. The amount of polymers (thick oils) formed depends upon the quantity of catalysts introduced, and upon the length of time the product remains in the distillation plant. The process is best carried out continuously with a length of time in the distillation plant of less than an hour, and with catalyst additions of 1%. In these circumstances less than 5% polymerization products are formed. When conventionally acid activated fullers' earths are used, for example, in the form of the trade product "Tonsil," then there is the advantage that these polymers give immediately utilizable lubricating oils. The activation of the fullers' earths is carried out for example by a treatment with hydrochloric or sulfuric acid.

A further reduction of the residual chlorine content is possible if the process is carried out continuously with two successively connected distillation columns. Here, in the first distillation apparatus practically the whole of the alkyl chlorides are already dechlorinated, so that the hydrochloric acid split off can be easily separated after the condensation of the distillate. The resultant polymerization compounds collects at the foot of the distillation column. After passing through the first column with, if need be, the addition of further quantities of contact materials and hydrochloric acid-combining substances such as zinc or magnesium oxide the distillate is subjected to further treatment in a second distillation column capable of very precise separation. Here the residual alkyl chloride collects in the sump whilst the product from which the chlorine has been removed (olefin) escapes at the head of the column. The sump product of the second column returns to the starting substances of the first column. The products formed in the two columns operation contain less than 0.1% residual chlorine.

If alkyl chlorides with a hydrocarbon count of $C_{10}$ or below are to be dechlorinated by the process according to the invention, then these, mixed with aluminum hydrosilicates, are introduced into a sufficiently deep layer of high molecular hydrocarbons heated to 200°–300° C. preferably 220°–240° C., and normally liquid within this temperature range.

The alkyl chlorides mixed with aluminum hydrosilicates are preferably introduced from below so that they may rise up through the layer with vaporization, splitting off of the hydrochloric acid, and the formation of the corresponding olefins. The layer of high molecular hydrocarbons used as the dechlorination medium may preferably consist of the polymerization products formed during dechlorination. It is particularly effective if the layer of high molecular hydrocarbons is caused to move in a thermo-syphon circuit. In the drawing a plant layout adapted for this method of carrying out the process according to the invention is diagrammatically illustrated by way of example.

There is provided a mixing vessel 1, where the alkyl chloride to be dechlorinated is mixed with the necessary catalyst. Through a pipe 2 nitrogen is passed in under pressure. The slimy paste produced between the catalyst and the liquid alkyl chloride flows through pipe 3 to the bottom of a vessel 4, the top of which is extended into a pipe 5 and the bottom of which is extended into a pipe 6 running parallel to it. This produces a closed liquid circuit the level of which can be read off on an indicator device 7.

Below the vessel 4 is mounted a heating device 8 which heats the hydrocarbon mixture in pipe 5 to a temperature of 200°–300° C., preferably 220°–240° C. and causes a thermic flow in the column of liquid in pipe 5, which causes the movement of the hot dechlorination agent upwards in the pipe 5 and downwards in the pipe 6.

The mixture of alkyl chloride and catalyst flowing in through the pipe 3 and heated in the mixing vessel 1 to a temperature just below boiling point, rises, by virtue of its lower specific gravity to the top of the hydrocarbon mixture in the pipe 5. It here vaporizes, and simultaneously with the formation of olefins gaseous hydrogen chloride escapes.

From the upper surface of the hydrocarbon charge present in the thermosyphon circuit the vapor passes through a head piece 9 into the fractionating column 10. From column 10 the distillates flow into a totally condensing cooler 11, whilst the alkyl chlorides separated-off in the fractionating column, and some polymers carried over with them flow through pipe 12 through the vessel 4 to the high boiling hydrocarbon mixture circulating in the thermo syphon circuit. The condensate of cooler 11 flows through pipe 13, according to the return flow ratio obtaining, partly as return flow back into the fractionating column 10, whilst part is led through a pipe 14 to a second fractionating column 15, also operating continuously, from the sump 16 of which the residual alkyl chloride separated-off in the fractionating column 15 is drawn-off and returned to the original product in vessel 1. The column 15 has a totally condensing cooler 17 and a connected cooler 18 in which the chlorine-free olefin mixture can be subsequently cooled.

The hydrochloric acid split off from the alkyl chlorides escapes at the head of the cooler 11 through the pipe 19. Since in dechlorination there constantly occurs, to some slight extent, a polymerization of the reaction, the liquid content of the thermosyphon circuit increases. By means of the valve 20 this surplus liquid can be removed continuously or intermittently.

A further advantage of the process according to the invention consists in that, by means of it, in a particularly simple manner and without any increased formation of by-products, pure 100% mono-olefins can be manufactured, if, as raw material for the dechlorination pure alkyl mono-chlorides are used, which contain neither hydrocarbons nor higher chlorination products. The isolation of these pure mono-chlorides from hydrocarbon-chlorination mixtures is relatively simple, starting from saturated hydrocarbons which were previously subdivided in fractions of individual C counts. A fractionation of this type may be carried out particularly simply with preponderately straight link hydrocarbons obtained from catalytic carbon monoxide hydrogenation.

For many purposes in synthetic organic chemistry the use of 100% olefins is advantageous. Previously, however, it was not technically possible to manufacture highly concentrated olefins completely free from the diolefins undesirable in the majority of reactions, since it has not been possible to carry out successfully a separation of diolefins. These difficulties are overcome by the new process.

From the point of view of industrial technique the dechlorination of the pure alkyl monochlorides follows in the manner described above, and in a liquid phase consisting either of the alkyl monochloride to be dechlorinated, or of polymerized by-products of dechlorination.

*Example I*

Into a distillation vessel adapted to hold 900 ccm. with a 1 metre high fractionating column mounted on it of 50 mm. internal diameter, the column being filled with glass rings of 5 mm. diameter and provided with a cooler for total condensation, there are passed per hour 1000 gm. of a chlorinated $C_{13}$ fraction mixed with 10 gm. of aluminium silicate (trade-mark: "Tonsil"). This alumination silicate was prepared out of Bavarian bleaching clay with hydrochloric acid. The $C_{13}$ hydrocarbon fraction used for chlorination was previously manufactured at atmospheric pressure with cobalt catalysts by catalytic carbon monoxide hydrogenation with subsequent precise fractionation and hydrogenation, and chlorinated to a chlorine content of 10.4%. The distillation vessel is provided with a stirring device in order to prevent a caking of the heated "Tonsil." The product flowing from the still is led into a second still to contain 250 ccm., which has a lateral gas connection to the same fractionating column. From the sump of this second still the polymerization products boiling above $C_{13}$ are drawn off. The fractionating column operates with a back flow ratio of 1:10. The temperatures amount in the first distillation vessel to 235° C., in the second distillation vessel to 245° C. and at the head of the distillation column to 220° C. At the head of the column hydrogen chloride gas and a $C_{13}$ fraction of olefin content are given off. The olefin content determined from the iodine number amounts to 48%. The residual chlorine content is about 0.22%. The ratio by weight of $C_{13}$ distillate to polymerization products amounts to 96%:4%.

*Example II*

The thermosyphon tube (5/6) illustrated in the drawing, has a height of 200 cm. Whilst the fractionating column mounted upon it is used with a length of approximately 100 cm. and a diameter of 50 mm. Column 10 is filled with glass rings of 5 mm. diameter. To begin with the thermo-syphon system is filled with polymerization products from a previous dechlorination charge, in which is admixed as catalyst 2% aluminum hydrosilicate (trade-mark "Tonsil"). From the stirring vessel 1 there are passed per hour 500 gm. of alkyl chloride, which was manufactured from a $C_8$ fraction by the addition of 15.8% chlorine.

As starting product in the hydrocarbon chlorination a saturated $C_8$ fraction was used, which was obtained synthetically by catalytic carbon monoxide hydrogenation over cobalt catalysts, and was isolated by precise fractionation.

The 500 gm. of alkyl chloride passed in from the mixing vessel 1 were previously heated to approximately 120° C. and mixed with 5 gm. of aluminum hydrosilicate (trade-mark "Tonsil"). In the oil circulation system a temperature of 220°–230° C. obtains, and at the head of the distillation column a temperature of 120° C.

The $C_8$ fraction given off at the head of the fractionating column 10 still contains approximately 1% chlorine in the form of alkyl chlorides. The separation of these residual quantities of alkyl chloride follows in the successively connected second column 15. This column has a height of 200 cm. and a diameter of 50 mm. Its filling consists of glass rings of 3 mm. diameter. The back flow ratio used in its operation amounts to approximately 1:10. At the base of this second fractionating column 15 the residual alkyl chlorides are drawn off. At the head of this column escapes an olefinic product containing less than 1% chlorine. Its olefin content obtained from the iodine number amounts to 52%. The proportion by weight of $C_8$ distillate to polymerization product amounts to 97%:3%. Gaseous or liquid separation products are not formed.

*Example III*

For the manufacture of a pure 100% $C_{13}$ monochloride the process according to the invention operates as follows:

By means of cobalt catalysts a hydrocarbon mixture is obtained by catalytic carbon monoxide hydrogenation, from which the $C_{13}$ fraction is separated by precise fractionation and converted to fully saturated hydrocarbon by subsequent hydrogenation. This starting material is converted to hydrocarbon-chlorination products in the usual way by treatment with gaseous chlorine. From these chlorination products pure $C_{13}$ mono-chloride is separated by vacuum distillation.

For the dechlorination a distillation vessel of 350 ccm. content is used provided with a 1 m. high fractionating column of 50 mm. internal diameter. The tube of the column is filled with glass rings of 3 mm. diameter and equipped with a cooler for total condensation. Into this precise fractionation device are passed 500 gm. per hour of pure $C_{13}$ mono-chloride into which previously 5 gms. of aluminum hydrosilicate (trade-mark "Tonsil") have been introduced in the form of a paste.

In the distillation vessel a temperature of 230° C. obtains, and at the head of the distillation column a temperature of 220° C. The back flow ratio is adjusted to 1:10.

At the head of the column gaseous hydrogen chloride escapes and a $C_{13}$ fraction of olefin content which still contains 0.4% chlorine. The $C_{13}$ fraction is passed into a connected second distillation column, also working continuously of height 2m. and diameter 50 mm. This column is filled with glass rings of 3 mm. diameter, and operates with a back flow ratio of 1:10.

The bottoms product given off in the second column is returned to the first column and there dechlorinated with fresh alkyl chloride.

From the distillation vessel of the first column the high boiling polymerization products formed in the dechlorination are continuously drawn off.

The $C_{13}$ olefin taken from the second column as top product is completely pure and contains no diolefins. Its olefin content, determined from the iodine number amounts to 100%, the residual chlorine content amounts to less than 0.1% Cl. The proportion by weight of $C_{13}$ distillate to polymerization product amounts to 98%:2%; gaseous or liquid dissociation products are not formed.

Example IV

A $C_{14}$ fraction as obtained from catalytic hydrogenation of carbon monoxide is converted into a pure $C_{14}$ monochloride employing chlorination and subsequent vacuum distillation in the customary way. In a 2 liter round flask 10 gm. kaolin are added to 1 kg. monochloride and the mixture is heated to 240° C. for 2 hours under agitation and while passing over small amounts of nitrogen. After cooling down the mixture is filtered and the filtrate is subjected to fractionation. Thereby 94% distillate and 6% polymerized products, the latter boiling higher than $C_{14}$ are obtained. The chlorine content of the distillate is 0.5% and the olefin content as determined from iodine number is 99%.

As is apparent from the foregoing, the invention thus broadly comprises the production of olefins by dechlorination of alkyl chlorides by subjecting, in liquid phase, an alkyl chloride and preferably one normally liquid at ordinary temperature and having not in excess of $C_{20}$, to a temperature of 180–300° C. and preferably 180–250° C. in the presence of an aluminum hydrosilicate and preferably of the activated fuller's earth type present in form .2–5% and preferably .5–1% by weight of alkyl chloride and recovering the resulting olefin.

Within the preferred embodiment of the invention, a normally liquid alkyl chloride having not in excess of $C_{10}$ is passed as a mixture with particled aluminum hydrosilicate into and through a hydrocarbon material maintained at a temperature between about 200 and 300° C. and preferably 220–240° C., said hydrocarbon material being liquid at said temperature and while substantially maintaining said hydrocarbon at said temperature to thereby vaporize the alkyl chloride and recover the resulting olefins from the vapor phase above the hydrocarbon material whereby preferably such vapor phase removal is carried out by way of fractionating distillation under conditions of alkyl chloride reflux.

Wherever the expression "liquid phase" or one of similar import is used herein in connection with the hydrosilicate heat treatment of an alkyl chloride in accordance with the invention, it is intended to designate thereby a liquid phase within which the dechlorination reaction takes place whereby such liquid may be a hydrocarbon material liquid at the reaction temperature, or, any other material liquid at the temperature and not tending to interfere with the dechlorination reaction in accordace with the invention and including such material as for instance the polymers obtained or obtainable in the dechlorination reaction itself as carried out by the method of this invention.

We claim:

1. Method for the production of olefins by dechlorination of alkyl chlorides, which comprises mixing alkyl chloride having less than 20 carbon atoms selected from the group consisting of single alkyl chlorides and mixtures of alkyl chlorides not varying in molecular size by more than 1 carbon atom, with an aluminum hydrosilicate in the liquid phase, maintaining the liquid mixture at a temperature of about 180–250° C., while substantially continuously distilling therefrom gaseous hydrogen chloride and olefins, and removing polymerization products from the liquid mixture.

2. Method according to claim 1, in which said aluminum hydrocilicate is present in amount of from about .2 to 5% of the alkyl chloride.

3. Method according to claim 1 in which said hydrosilicate is activated fuller's earth present in from .5 to 1% by weight of alkyl chloride.

4. Method according to claim 1 in which said liquid mixture is maintained in heat induced circulating motion.

5. Method according to claim 1, in which the mixture of alkyl chloride and aluminum hydrosilicate is introduced below the surface of a hydrocarbon normally liquid at a temperature between about 200–300° C. for said continuous distillation and removal of polymerization products.

6. Method according to claim 5, in which said alkyl chloride is an alkyl chloride having a molecular size not in excess of $C_{10}$.

7. Method according to claim 6, in which said liquid hydrocarbon is maintained in heat-induced circulating motion.

8. Method according to claim 7, in which said liquid hydrocarbon comprises polymerization product derived from the dechlorination of the alkyl chlorides.

9. Method according to claim 1 in which fresh alkyl chloride aluminum hydrosilicate mixture is substantially continuously passed into said liquid mixture.

10. Method according to claim 9 in which said hydrosilicate is activated fuller's earth.

11. Method according to claim 10 in which said distillation includes passing the gaseous products through two successive separate upwardly extending fractionating zones, removing from adjacent the end of said first zone split-off HCl gas, and returning the bottoms products from said second zone to said liquid mixture.

NIKOLAUS GEISER.
HELMUT KOLLING.

References Cited in the file of this patent
UNITED STATES PATENTS

| Number | Name | Date |
|---|---|---|
| 1,384,447 | Gardner et al. | July 12, 1921 |
| 1,969,047 | Smith | Aug. 7, 1934 |
| 2,050,427 | Fisher | Aug. 11, 1936 |
| 2,164,334 | Marks | July 4, 1939 |
| 2,328,707 | Clar et al. | Sept. 7, 1943 |
| 2,419,198 | Bowman | Apr. 22, 1947 |
| 2,488,083 | Gorin et al. | Nov. 15, 1949 |